June 22, 1943.  M. B. OWEN  2,322,659
INCINERATION OF LIQUID SEWAGE SLUDGE AND THE LIKE
Filed Feb. 21, 1941  2 Sheets-Sheet 1

INVENTOR.
MARK B. OWEN.
BY Ward, Crosby + Neal
ATTORNEYS

June 22, 1943.  M. B. OWEN  2,322,659
INCINERATION OF LIQUID SEWAGE SLUDGE AND THE LIKE
Filed Feb. 21, 1941  2 Sheets-Sheet 2
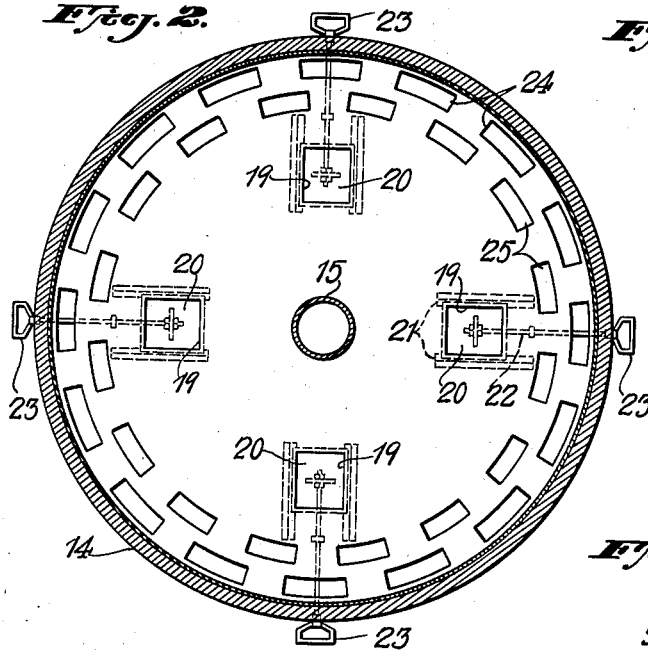
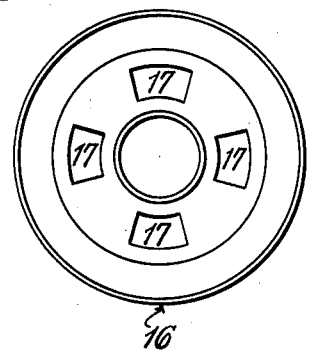
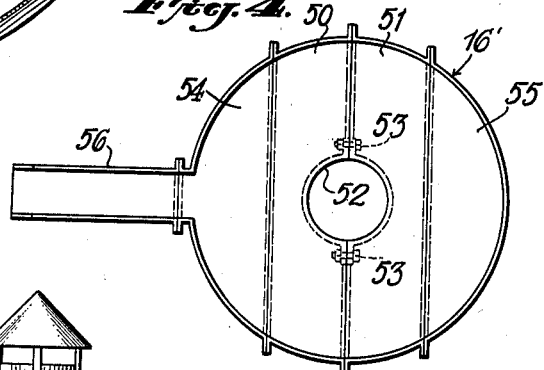
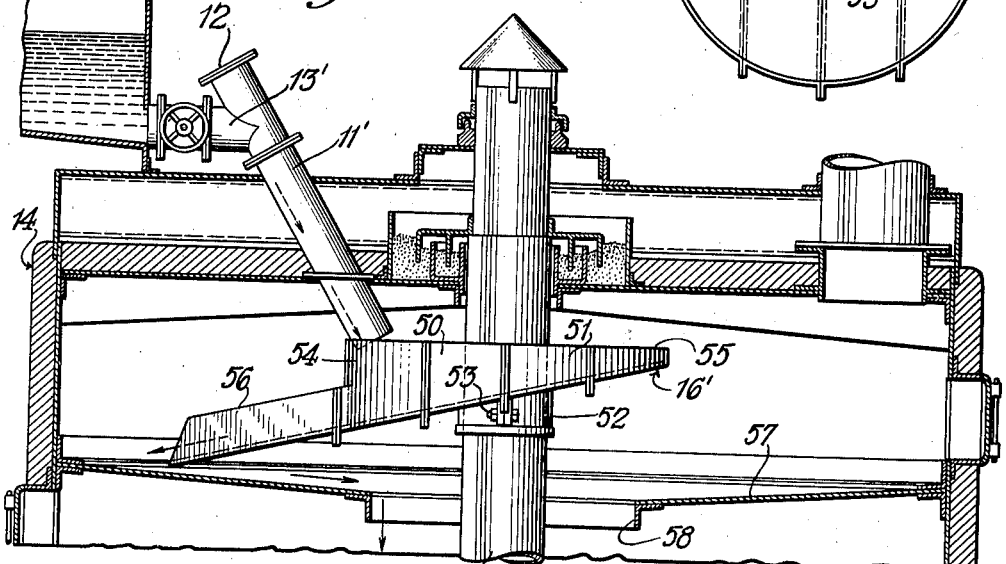
INVENTOR.
MARK B. OWEN.
BY
ATTORNEYS Patented June 22, 1943

2,322,659

UNITED STATES PATENT OFFICE 2,322,659

INCINERATION OF LIQUID SEWAGE SLUDGE AND THE LIKE

Mark B. Owen, Ardsley-on-Hudson, N. Y., assignor to Nichols Engineering & Research Corporation, New York, N. Y., a corporation of Delaware Application February 21, 1941, Serial No. 379,964

5 Claims. (Cl. 110—12)

This invention relates to improved methods and apparatus for incinerating liquid sewage sludge and the like, which in some cases may also include ground garbage or other combustible wastes.

It has heretofore been the practice to incinerate sewage sludge in superposed multiple hearth furnaces by methods which involve first passing the sludge through filtering apparatus so as to form filter cake of a substantially reduced moisture content and in a form such that it may be easily rabbled in the furnace while it is being rapidly dried and then burned. However, the original cost of suitable filtering apparatus for such purposes, the expense and trouble of maintaining the same in good operating condition, the high cost of chemicals required for conditioning and flocculating the sludge prior to filtration and the high degree of skill required for sludge conditioning and filtering, together with the difficulties of conveying filter cake on belts to the incinerator, all offer serious objections to the use of such equipment, particularly for the smaller or medium sized sludge incinerating plants. Heretofore no generally satisfactory methods or equipment have been available with which the sludge, while still in liquid form, could be introduced directly into a superposed multiple hearth type of furnace for drying and thorough incineration under practical conditions, without production of objectionable odors, or without excessive expense for fuel or the construction of furnaces of abnormally large size.

The present invention involves a novel, inexpensive multiple superposed hearth furnace construction embodying means for so introducing and distributing the liquid sludge and controlling its flow and heating in the furnace, that the above indicated problems are overcome.

Various further and more specific objects, features and advantages will clearly appear from the detailed description given below taken in connection with the accompanying drawings which form a part of this specification and illustrate by way of example certain preferred forms of the invention. The invention consists in such novel features and combinations of parts as may be shown and described in connection with the apparatus herein disclosed, and also such novel methods as are disclosed herein.

In the drawings,

Fig. 2 is a horizontal sectional view showing the first or uppermost hearth of the furnace of Fig. 1;

Fig. 3 is a plan view of a sludge distributing pan which may be used in the construction of Fig. 1;

Fig. 4 is a plan view of an alternative form of sludge distributing pan which may be used in connection with another embodiment of the furnace; and Fig. 5 is a vertical cross-sectional view showing the upper portions of such other embodiment.

Figure 1:
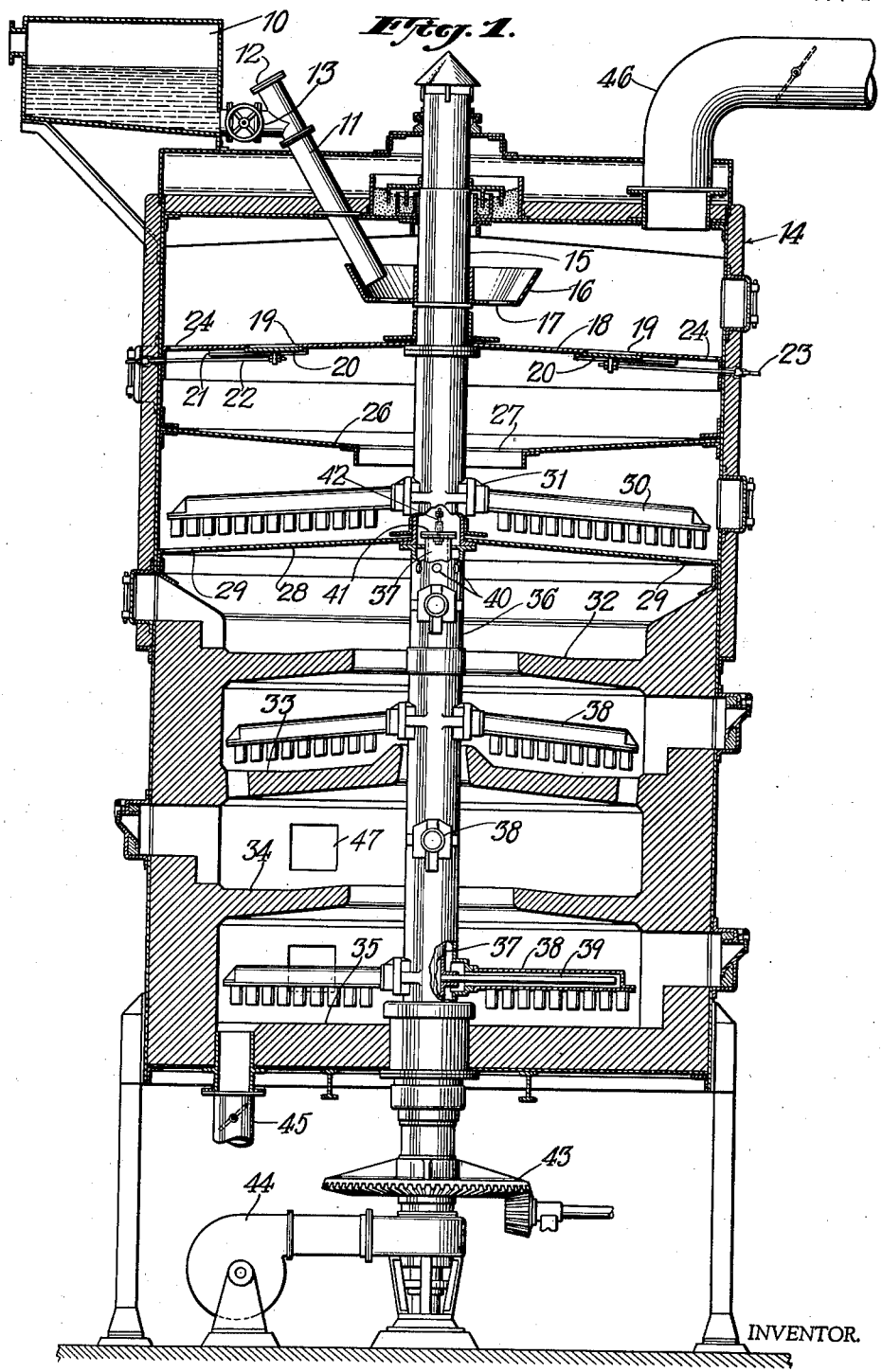
Fig. 1 is a vertical cross-sectional view of one form of apparatus embodying the invention.

Referring to Fig. 1 in further detail, a tank or reservoir 10 is shown for receiving from any suitable source, supplies of the liquid sludge or other waste material which is to be dried and incinerated. This tank may have an outlet pipe with a valve or other means provided as at 13, connecting the lower portion of the tank to the pipe 11 for regulation of rate of flow. A blank plate as at 12 may be bolted over a flange at the upper end of pipe 11 to provide a ready means for access or cleaning.

As shown, the pipe 11 may lead through the top wall structure of and into a superposed multiple hearth furnace 14 having a rotatable central shaft as at 15. A sludge distributing pan as at 16 may be secured around this shaft so as to embrace the same and rotate therewith in a position to receive supplies of the liquid sludge from the pipe 11. As shown in Figs. 1 and 3, the pan 16 may be formed with a plurality of discharge apertures as at 17 so that when the pan rotates the sludge will be distributed annularly about the shaft 15 and at the middle portion of the first or uppermost hearth 18 of the furnace. This hearth is preferably formed of good heat-conductive material such as sheet metal, and preferably has a slightly conical shape so that the liquid distributed thereon will flow radially outwardly of the hearth without requiring the use of rabbling means at this point. Meanwhile the liquid on this hearth will be heated by reason of relatively hot gases rising from lower portions of the furnace.

At points spaced from the central area of the hearth 18, a plurality of openings as at 19 may be formed and accompanied by slidably adjustable gates or plates as at 20. These gates may slide in cooperating pairs of guides as at 21 extending generally radially of the hearth. Also the gate members or plates may be connected to operating rods as at 22 extending slidably through the walls of the furnace to operating handles as at 23. These adjustable gates will permit controlled portions of the heated liquid sludge to pass through hearth 18 before such portions can reach the peripheral openings as at 24, 25, through which the remainder of the sludge is discharged from hearth 18 to the next succeeding hearth.

The second or next succeeding hearth 26 is also preferably formed of sheet metal, but is made slightly conical, i. e., as an inverted cone, so that the liquid sludge which falls on this hearth from the openings 19, 24, 25 will flow radially inwardly of the hearth to a central discharge port as at 27, from which the sludge is now discharged on to a third sheet metal hearth as at 28 having peripheral discharge ports as at 29. The hearth 28 as shown may also preferably be slightly conical with the highest portions at the middle areas as in the case of hearth 18. By the time the sludge reaches the hearth 28, it will preferably have been heated to such a degree and for a sufficient length of time so as to be in a semi-solid condition and accordingly at this hearth rabbling arms as at 30 are preferably provided, attached as at 31 to rotate with the shaft 15. These rabbling arms may be provided with teeth as shown, of suitable well-known types, for gradually and periodically advancing the material over the hearth 28 to the discharge ports 29 and thence on to the next hearth 32.

Inasmuch as the portions of the furnace above the hearth 32 will not normally be heated to very high temperatures, these portions may be made of steel, with a considerable saving of expense as compared with the use of hearths and furnace walls of refractory material as provided for the lower portions of the furnace. Also the portion of the central shaft above the hearth 28, and the rabble arms 30, need not necessarily be air-cooled and may be made of metal less expensive than the heat-resistant metal used in the rabbling structure of the lower parts of the furnace. The upper portions of the furnace wall as shown may be formed of sheet metal facing the interior of the furnace and covered externally if desired by heat insulating material, whereas for the lower high temperature regions of the furnace, the sheet metal walls as shown are preferably faced internally with walls of refractory and heat insulation material.

As shown, the upper edges of the refractory portion of the furnace wall are preferably inclined inwardly so that the sludge upon falling from the discharge ports 29 of hearth 28 will be directed inwardly of the furnace onto the periphery of hearth 32. From then on, the sludge is rabbled by teeth on rabble arms as at 38, alternately inwardly and outwardly of the hearths 32–35 inclusive, down through the remainder of the furnace, these alternate hearths respectively being formed with central and peripheral discharge ports. The lower portions of the furnace from hearth 32 down, may be constructed if desired substantially in accordance with the construction shown and described in patent to Dudley Baird and Robert W. Rowen, No. 2,015,050, granted September 17, 1935.

It is noted that the lower portion 36 of the central shaft encloses an internal cooling air shaft 37. This cooling air may be carried into the rabble arms 38 as by internal arm conduits 39, the air being discharged from the outer ends of these conduits. From the ends of the rabble arms the cooling air may travel back through the arms and into the space between the inner and outer shafts 36 and 37 and thence up to discharge outlets as at 40 located in the walls of shaft portion 36 at a point above hearth 32. Approximately at the level of hearth 28 the upper end of the internal shaft 37 may be closed off by plate 41 as shown, and a suitable known type of "pop valve" as at 42 may be mounted in this plate for releasing any excessive air pressures, permitting excess air to travel up through the upper shaft section 15 and thence out to the atmosphere. The central shaft may be rotated by a suitable motor connected through gearing as at 43. The supply of cooling air may be introduced into the internal shaft 37 by a blower 44 connected at the base of the shaft in a well-known manner.

The ash resulting from the incineration process may be discharged through a suitable dampered outlet as at 45 and the evolved gases after traveling up through the ports of the various hearths and over the hearths in succession, may be discharged at the top of the furnace as through a suitable dampered outlet flue 46. Oil or gas burners or other means for supplying auxiliary heat, may be introduced at one or more of the lower hearths as through openings 47.

In operating the above described apparatus, the liquid sludge or waste material as introduced from the tank 10 may preferably have a moisture content in the neighborhood of from 90 to 85%. By suitably controlling the fuel burners, the adjustable gates 20, the air supply and the amount of sludge introduced, the temperature and moisture content at each hearth may, as is preferred, be kept approximately within the following ranges:

| Hearth | Percent H₂O in sludge | Gas temperature |
| --- | --- | --- |
| First | 84–89% | 400–600° F. |
| Second | 80–85% | 500–700° F. |
| Third | 65–70% | 600–800° F. |
| Fourth | 45–55% | 700–1,000° F., 900° F. av. |
| Fifth | 30–50%, 35% av | 1,100–1,400° F. |
| Sixth | 30% or less | 1,400–2,000° F., 1,600° F. av. |
| Seventh | 0–15 | 1,400–2,000° F. |

Thus, on the first two hearths, the action on the sludge will be largely that of heating the same up to temperatures such that drying will rapidly occur on the next lower hearths, although at least some moisture will be evaporated from the sludge, particularly on the second hearth. Drying will largely occur on hearths numbered 28, 32 and 33, while the incineration will occur on the lower two hearths and during the falling of the material from the ports of hearths 33 and 34.

The flue gas temperatures may be kept at from 400 to 600° F. or thereabouts, with an average of about 500°, so that no great amount of heat will be lost in the outlet gases.

In operating the furnace, if the temperatures at the middle of the furnace or at the second and third hearths should tend to become too high, thereby tending to scorch the surface portions of the sludge while the interior portions are still quite wet (with consequent danger of production of odors), then to reduce such temperatures the adjustable gates in the first hearth may be opened more widely and thereby more and cooler liquid sludge may be introduced to the second and third hearths. As a result, the region of highest temperatures will move downwardly in the furnace.

On the other hand, if in the central portions of the furnace it is found that the sludge is too moist for ready combustion or too moist for thorough combustion upon reaching the bottom of the furnace, then the adjustable gates in the first hearth may be moved to more nearly closed positions so that there will be less sludge passing through the first hearth and so that the sludge which does pass through this hearth will be at a somewhat higher temperature. As a result the temperatures at the incinerating hearths will tend to increase and the region of highest temperatures will tend to rise in the furnace.

In these ways and in conjunction with the control of the fuel burners and the air blower, the temperature conditions at the various hearths in the furnace may be quite easily controlled to the extent necessary, depending upon the varying fuel content of the introduced sludge, and the possibly variable amounts thereof.

The use of upper hearths formed of metal permits both the lower and upper surfaces of the layers of sludge thereon to be subjected to effective drying temperatures such as above listed.

The air supply used for cooling the rabbling structure in the lower portion of the furnace will preferably upon reaching the outlets 40, have been heated to temperatures in the neighborhood of from 400-700° F. Hence this air as discharged under some pressure from the fan 44 will provide a current for effectively carrying the evolved moisture up through the upper portions of the furnace and over the drying hearths and out through the conduit 46 without danger of reducing the temperatures at the drying hearths below a satisfactory range. At the same time, since the air from outlets 40 is at a temperature substantially less than the temperatures in the lower portions of the furnace, this air will serve to prevent the high temperature region from moving up in the furnace beyond hearth 32.

Thus in effect, the regions where wet sludge occurs in the furnace and the incinerating regions are separated against merging and the sheet metal hearth 28 is protected against temperatures which might damage the same. Also the wet material on this heaarth is kept from scorching and thus the possible formation of obnoxious odors by that cause is prevented.

The sludge distributing pan 16 insures against the lodging of any excessive quantity of the sludge at any one area of the first and second hearths, and thus cool areas which might give rise to production of odors and non-uniform drying or incineration, are prevented. Also the sludge distributing pan in acting to distribute the sludge annularly about the central portion of the top hearth, insures that substantially uniform amounts of the sludge will be subject to control by each of the several gates 20.

In the furnace above described it will be noted that an odd number of hearths is provided and that consequently the material is fed to the middle of the top hearth and the resulting ash is discharged from the periphery of the lower hearth. In some cases, as where an even number of hearths are used, it may be desirable to have a central discharge port for the top hearth with the consequence that the material has to be introduced to the periphery of the top hearth. In such cases a sludge distributing pan may be provided of a form shown in Figs. 4 and 5. This may comprise for example four flange complementary sections as at 50-55 inclusive, suitably secured together to form a circular pan. The inner sections 50, 51 may be formed with flanges as at 52 secured together as by bolts 53, so as to embrace in clamping engagement the rotatable shaft 15'. This pan may be provided at its periphery with a spout as at 56 extending out toward the periphery of the top hearth 57 so as to distribute the liquid sludge around such periphery. In this case the hearth 57 is made to incline slightly inwardly so that the liquid flows radially inwardly to a central discharge port 58.

While the invention has been described in detail with respect to particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. Apparatus for drying and incinerating a substantially liquid waste material, comprising a furnace having a series of superposed hearths, including a plurality of upper drying hearths formed of sheet metal and a plurality of lower burning hearths formed of refractory material, a central rotatable shaft carrying rabbling means cooperating with the hearths of the mid-portion and lower portion of the furnace for rabbling the material over said hearths and from each burning hearth to the next, means rotatable with the upper portion of said shaft for receiving the liquid waste material and distributing same annularly around the mid-portion of the upper hearth, adjustable gate means at spaced points around the area of the latter hearth for discharging the liquid waste from the upper hearth to the next, conduit means for conducting cooling air through said shaft and said rabbling means and for discharging portions of such air after heating in the rabbling means, onto the partially dried waste material in the furnace, and means for burning fuel at one or more of said burning hearths, the hearths being formed with ports permitting gases of combustion, air and vapor to travel upwardly through the furnace, countercurrent to downward travel of the material.

2. Apparatus for drying and incinerating a substantially liquid waste material, comprising a furnace having a series of superposed hearths, including a plurality of upper drying hearths formed of sheet metal and a plurality of lower burning hearths formed of refractory material, the hearths being each formed with gas ports, a gas outlet flue adjacent the upper drying hearth, the parts being constructed and arranged whereby gases of combustion travel up through the furnace over the burning hearths and then directly against and over the drying hearths in succession and out through said flue, a central rotatable shaft carrying rabbling means cooperating with the hearths of the mid-portion and lower portion of the furnace for rabbling the material over said hearths and from each burning hearth to the next through said ports, and communicating conduits and passages in said rabbling means for conducting cooling air therethrough and for then discharging such air into the furnace approximately at points between the lowermost metal hearth and the port of the uppermost refractory hearth, to thereby protect said metal hearths from the rising streams of high temperature combustion gases.

3. Apparatus for drying and incinerating a substantially liquid waste material, comprising a furnace having a series of superposed hearths formed with ports, said hearths including a plurality of upper drying hearths and a plurality of lower burning hearths, a central rotatable shaft carrying rabbling means cooperating with the hearths of the mid-portion and lower portion of the furnace for rabbling the material over said latter hearths and from each of such hearths to the next, means rotatable with the upper portion of said shaft for receiving the liquid waste material in the furnace and distributing same annularly around the upper hearth, and gate means in the upper hearth at an area spaced from the areas on which the material is initially distributed, for variably controlling the discharge of liquid from such hearth.

4. In a superposed multiple hearth furnace of the type providing for the travel of material over alternate hearths respectively, outwardly to peripheral discharge ports, and inwardly to central discharge ports, means for reducing the length of the path of travel over said hearths, of a variable portion of the material, comprising adjustable gate means in one of said hearths at a position spaced substantially from both the peripheral and central areas of such hearth.

5. In a superposed multiple hearth furnace having a plurality of upper drying hearths and a plurality of lower burning hearths, rabbling structure including a central vertical shaft, rabbling means carried by said shaft for rabbling the material over the hearths of at least the lower portions of the furnace and from each of such hearths onto the next, a cooling fluid conduit system inside the rabbling structure at said burning hearths, the rabbling structure being formed with apertures for normally discharging such cooling fluid adjacent a burning hearth, and a pressure-responsive release valve inside said shaft for discharging cooling fluid from said conduit system to the interior of the upper portion of said shaft when pressure in said conduit system exceeds a predetermined amount.

MARK B. OWEN.